United States Patent [19]
Crossley

[11] Patent Number: 5,866,225
[45] Date of Patent: Feb. 2, 1999

[54] MOSAIC REPRODUCTIONS ON A TILE SUBSTRATE

[75] Inventor: John W. Crossley, Upper Black Eddy, Pa.

[73] Assignee: Vitrium Corporation, Doylestown, Pa.

[21] Appl. No.: 826,868

[22] Filed: Apr. 11, 1997

[51] Int. Cl.⁶ .................................................. B44F 11/04
[52] U.S. Cl. .............................................. 428/49; 156/63
[58] Field of Search ........................... 428/15, 49; 156/63

[56] References Cited

U.S. PATENT DOCUMENTS

| | | | |
|---|---|---|---|
| 4,522,855 | 6/1985 | Bethea | 428/49 |
| 4,621,001 | 11/1986 | Bard | 428/49 |
| 4,931,331 | 6/1990 | Owens | 428/15 X |
| 5,328,730 | 7/1994 | Lowe | 428/15 |
| 5,583,079 | 12/1996 | Golitz et al. | 428/49 X |

*Primary Examiner*—Henry F. Epstein
*Attorney, Agent, or Firm*—Armand M. Vozzo, Jr.

[57] ABSTRACT

Disclosed herein is an improved method of producing a mosaic design on the surface of a ceramic tile substrate and the resultant mosaic tile article manufactured thereby. A selected glaze coating is initially applied to the tile substrate upon specific surface areas predetermined for coloration as part of the mosaic design with the glaze coating being varied in hardness dependent upon the intended architectural or other use of the tile. After firing the selectively glazed tile substrate to harden the coating, a ceramic coloration pattern of the mosaic design is applied over the glaze coating using direct printing or decal transfer to produce a decorated tile. After re-firing the decorate tile, a resist medium is further applied over the colored and glazed areas as a mask, leaving the intermediate areas of the tile substrate unmasked. After curing of the resist medium, conventional sandblasting or other engraving techniques are employed to remove substrate material from the unmasked areas to a desired depth thereby creating realistic grout line spaces intermediate of the colored areas. The excess resist medium is then removed from the surface of the substrate and the entire surface of the resultant mosaic tile article re-coated with a clear protective glaze, as may be necessary for certain architectural applications prior to use.

15 Claims, 1 Drawing Sheet

U.S. Patent
Feb. 2, 1999
5,866,225
Fig. 1
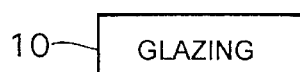
10 — GLAZING
15 — FIRING
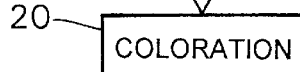
20 — COLORATION
25 — FIRING
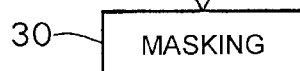
30 — MASKING
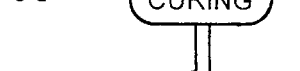
35 — CURING
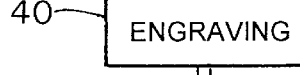
40 — ENGRAVING
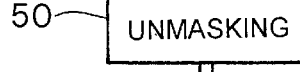
50 — UNMASKING
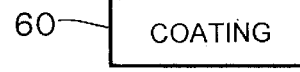
60 — COATING
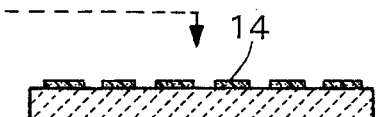
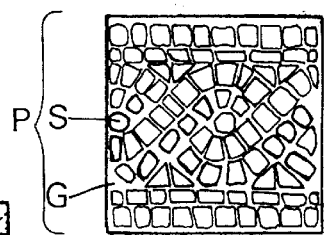
Fig. 2A
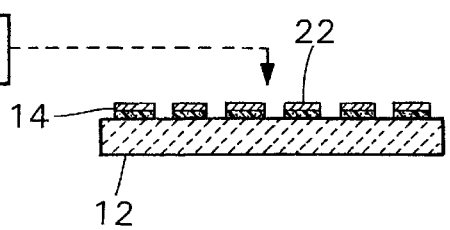
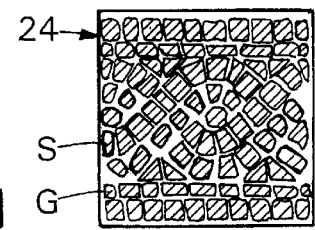
Fig. 2B
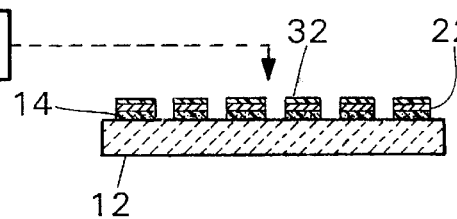
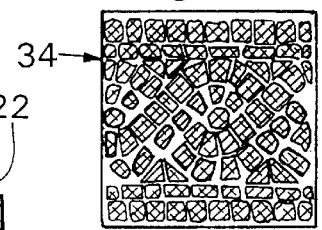
Fig. 2C
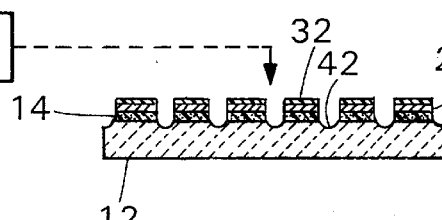
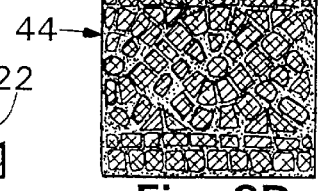
Fig. 2D
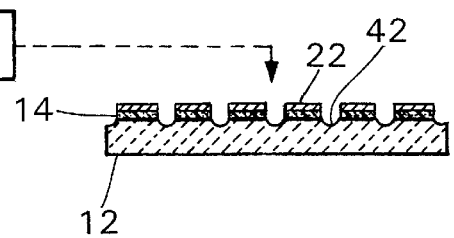
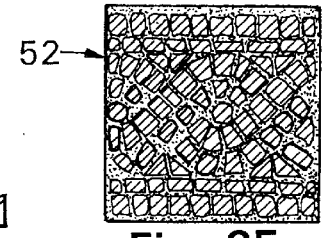
Fig. 2E
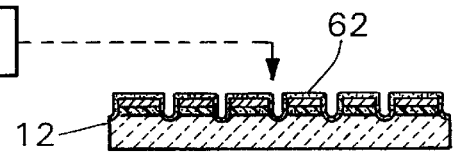
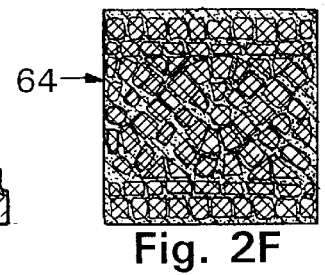
Fig. 2F

MOSAIC REPRODUCTIONS ON A TILE SUBSTRATE

BACKGROUND OF THE INVENTION

The present invention relates to the production of mosaic artwork, and more particularly to an improved process for recreating mosaic artwork on a tile substrate.

Mosaic artwork has been produced for centuries and in recent times, such artwork has become fashionable and popular to use in architectural design. Mosaic tiles are used on floors, walls and as architectural accents in a variety of buildings and the techniques employed for creating these intricate mosaic articles have changed little over time. The age-old manual process for creating the mosaic generally includes the cutting of small pieces of glass, stone or ceramic and the setting of these mosaic pieces in a pattern of the desired design. Typically, each piece is glued face down on a canvas or paper backing and thereafter set together in plaster or cement applied on the reverse side. The paper or canvas is then peeled away after the setting compound has cured. The areas in between each individual piece are then grouted with a wash of plaster or similar grouting material. After drying, the resultant mosaic tile provides an aesthetic decorative impression with particular artistic appeal to the observer due to the individuality of each mosaic piece in both dimension and color. This hand-set process for mosaic tile production is obviously time-consuming and requires the skills of craftsmen to custom design, cut and cement the individual mosaic pieces in order to create the desired effect. Such hand-set mosaic tiles are thus particularly difficult and expensive to produce in large quantities, and although the ornamental effect is desirable, the cost is prohibitive.

One alternative to the costly hand-set production of mosaic tiles has been provided through the method of casting thermoset mosaic style patterns. Such thermoset casting methods have employed molds that incorporate mosaic-style surfaces designed to recreate the mosaic impression on the finished article. While such casting methods have produced tiles and other articles in the mosaic style much more economically than the hand-set process, the surface impression generally obtained by the casting methods have not recreated an authentic looking mosaic effect. In the case of tile articles, the tile cast with the mosaic surface is typically glazed and the individual mosaic areas are decorated with a limited number of colors. The mosaic finish of these cast tiles is confined to the mold pattern and generally characterized by a relatively uniform facade void of the fine subtleties and artistic definition of hand-set mosaics. A need, therefore, exists for a cost-effective method of recreating the mosaic effect in patterns and artwork deposited on a tile substrate.

SUMMARY OF THE INVENTION

Accordingly, it is a general purpose and object of the present invention to provide an improved method of making mosaic tile articles having the surface finish and look of hand-set mosaics.

A more specific object of the present invention is to create mosaic style designs on the surface of a tile substrate that exhibit the artistic detail and definition of a hand-set mosaic in a more cost effective manner.

A further object of the present invention is to provide authentic looking reproductions of mosaic artwork on a tile substrate having the same aesthetic effect and visual impression of a hand-set mosaic but at a substantially reduced cost.

A still further object of the present invention is to provide a more efficient and reliable manufacturing process for reproduction of mosaic artwork on a tile substrate with more exact and expanded colorations of the surface finish than heretofore produced without hand painting.

Briefly, these and other objects of the present invention are accomplished by an improved method of producing a mosaic design on the surface of a ceramic tile substrate and the resultant mosaic tile article manufactured thereby. A selected glaze coating is initially applied to the tile substrate upon specific surface areas predetermined for coloration as part of the mosaic design with the glaze coating being varied in hardness dependent upon the intended architectural or other use of the tile. After firing the selectively glazed tile substrate to harden the coating, a ceramic coloration pattern of the mosaic design is applied over the glaze coating using direct printing or decal transfer to produce a decorated tile. After re-firing the decorated tile, a resist medium is further applied over the colored and glazed areas as a mask, leaving the intermediate areas of the tile substrate unmasked. After curing of the resist medium, conventional sandblasting or other engraving techniques are employed to remove substrate material from the unmasked areas to a desired depth thereby creating realistic grout line spaces intermediate of the colored areas. The excess resist medium is then removed from the surface of the substrate and the entire surface of the resultant mosaic tile article re-coated with a clear protective glaze, as necessary for certain architectural applications, prior to use.

For a better understanding of these and other aspects of the present invention, reference may be made to the following detailed description taken in conjunction with the accompanying drawing in which like reference characters designate like items throughout the figures thereof.

BRIEF DESCRIPTION OF THE DRAWINGS

For a fuller understanding of the nature and objects of the invention, reference shall be made in the following detailed description to the accompanying drawings in which:

FIG. 1 schematically illustrates in a block diagram the improved process for producing a mosaic design on a tile substrate in accordance with the present invention with a corresponding series of cross-sectional representations of a tile substrate sequentially resulting from the inventive process as shown; and FIGS. 2A–2F is a series of plan views corresponding to the sequentially processed tile substrates of FIG. 1.

DESCRIPTION OF THE PREFERRED EMBODIMENT

Referring now to drawings and particularly to FIGS. 1 and 2, the present invention discloses an improved process for recreating mosaic effect on a blank tile substrate 12. In accordance with the present invention, the blank tile substrate 12 used as a starting product is an unglazed architectural tile conventionally fabricated and formed of a ceramic material, such as terra cotta, stoneware or porcelain. The blank tile substrate 12 is typically produced having an MOH hardness factor of between 2–6 depending upon the specific architectural use intended for the tile, namely on walls, floors, ceilings or counters. The size and shape of the tile blank 12 will vary dependent upon the particular size and scale of the mosaic design intended to be exhibited across the surface of the tile substrate, such as the mosaic pattern P shown in FIG. 2A having separate stone pieces S and intermediate grout spaces G. The blank tile substrate 12 is initially processed according to the present invention by a selective glazing 10 of the upper surface of the substrate whereby a thin layer of a predetermined glaze 14, typically between 50–400 microns, is applied to specific site locations on the substrate surface corresponding to the stone areas S of the mosaic pattern P and distinguished from the grout spaces G thereof. The applied glaze layer 14 is preferably clear and made of a conventional glaze formulation that combines finely powdered glass "frits" and a flux material, such as lead, in varied proportions which render the final glaze layer to be "soft" (MOH hardness of 4–6) or "hard" (MOH hardness of 6–10). In accordance with the present invention, it should be noted that a "soft" glaze layer 14 is applied to the blank tile substrate 12 intended for architectural use on walls or ceilings, while a "hard" glaze is applied to the tile substrate intended for floors and other similarly trafficked surfaces. The selective glazing 10 of the blank tile substrate 12 10 may be effected by roller coating, spraying or direct screen printing of the substrate surface, with the predetermined glazed layers 14 being applied at specific site locations thereon by means of a master outline duplicate of the intended mosaic pattern P. After completing the initial step of selective glazing 10, the tile substrate 12 carrying the site-specific glazed layers 14 undergoes a firing step 15 whereby the combined glazed tile 16 is fired at temperatures from 720° C. to 1100° C. depending upon the formulation of the glaze layers.

Upon completion of the initial firing step 15, the selectively glazed tile 16 undergoes a coloration step 20 whereby the glazed tile is decorated with ceramic colorations 22 that are applied over the glazed layers 14 according to the pattern of the intended mosaic design. Using conventional techniques, the pattern of the mosaic design may be generated from a photographic reproduction of original mosaic artwork or may be such artwork created from an artist rendering of a mosaic design. The mosaic artwork pattern that is generated is then color separated and a series of silk screens created which can be used either to produce a decal in multiple ceramic process colors for transfer of the colorations 22 to the glazed tile 16 or to directly print the colorations onto the glazed layers 14 of the tile substrate 12. Decal transfer of the colorations 22 may be by a conventional water slide and heat release technique. The formulation of the ceramic colorations 22 is such that their composition is of a specially hard and durable nature, characteristically being relatively harder than the respective glazed layers 14 but having the same coefficient of expansion. As a result, the ceramic colorations 22 atop each respective glaze layer 14 constitute and establish the areas of the individual stone pieces S of the mosaic pattern P and further permit the grout line spaces G to be maintained therebetween. With the ceramic colorations 22 thus applied across the glazed surface areas 14 of the tile substrate 12, the resulting decorated tile 24 undergoes a second firing step 25 prior to further processing in accordance with the present invention. Firing of the decorated tile 24 may be performed in the temperature range of 500° C. to 1000° C., with the typical firing level being at 800°–850° C.

A masking operation 30 is conducted upon the decorated tile 24 upon completion of firing step 15. The masking operation 30 is necessary to protect the decorated surface of tile 24, namely, the ceramic colorations 22 formed upon the glaze layers 14 as individual mosaic pieces, from abrasive action designed to cut through the tile substrate 12, as described in greater detail below. A resist medium 32, composed of a rubber, vinyl or silicone plastic material, is applied to and deposited upon the decorated tile 24 using conventional techniques, the resist medium being formed only over the raised ceramic colorations 22 as a mask therefor. A resulting masked tile 34 is thus produced with the resist medium 32 masking the ceramic colorations 22 and leaving the spaces between the colorations unmasked. Conventional techniques most suitable and effective for use in the masking operation 30 to deposit the resist medium 32 in this fashion include photo-resist emulsion and computer precut frisket techniques. In the photo-resist emulsion technique, a layer of photo-sensitive film is applied to the decorated tile 24 and a black line artwork on clear film of the grout line spaces is further placed over the tile surface. The entire piece is then illuminated and the areas outside the black line art are fully exposed thus leaving a photo emulsion film as the resist medium 32. Those areas covered beneath the black line art are underexposed leaving the photo-resist emulsions uncured and easily washed away with water. In the computer frisket technique, the black line artwork is scanned into a computer program interfaced with a plotter cutter. The mosaic design is cut through a self-adhesive plastic film and the film in its cut form is placed over the decorated tile 24. The web of the self-adhesive film is then removed from the tile 24 thus leaving the mosaic pieces represented by the colorations 22 masked and protected from subsequent engraving. Alternatively to the above techniques, it should be further noted that a photo-sensitive liquid emulsion can also be screen printed directly onto the mosaic design of the decorated tile 24 and then exposed in a similar manner as the photosensitive film to produce the masked tile 34 suitable to subsequent processing. The masked tile 34 so produced then undergoes a curing stage 35 whereby the tile is exposed to either ultraviolet light or white light depending upon the resist formulation in order to fully cure and set the resist medium 32 in place for engraving as set forth below.

After curing, the masked tile 34 proceeds through an engraving operation 40 whereby unmasked areas of the tile substrate 12 located between and around the protected colorations 22 are etched away from the substrate surface to provide a resultant etched tile 52 having deepened grooves 42 representative of the grout space areas G of the mosaic pattern P. The engraving operation 40 is performed by conventional etching techniques including sandblasting with air or using water jet abrasive. The amount of pressure applied to the tile substrate 12 during the engraving operation 40 and type of abrasive medium used can be varied to control the depth and detail of grooves 42. It should be particularly noted that the deepened grooves 42 are etched away more rapidly and exhibit a tighter, crisper detail in their formation as a result of the corresponding surface areas of substrate 12 not being glazed between and around the masked colorations 22. The surface of the resultant etched tile 44, after unmasking and cleaning, thus presents a substantially authentic-looking and realistic hand-set mosaic effect.

Following the engraving operation 40, the etched tile 44 proceeds through an unmasking operation 50 whereby the resist medium 32 is removed from the ceramic colorations 22, typically by hot water immersion and washing, to produce an unmasked mosaic tile 52 having raised colorations 22 and deepened grooves 42 across its surface duplicative of the stone pieces S and grout line spaces G of the mosaic pattern P. The unmasked tile 52 may be cleaned and touched-up, if necessary, prior to a final coating step 60 wherein a clear glaze coat 62 is applied across the entire tile surface to protect and seal the underlying colorations 22 and deepened grooves 42 of the finished tile product 64.

Therefore it is apparent that the disclosed invention provides an improved method of producing mosaic tile articles having the simulated surface finish and look of hand-set mosaic pieces. The mosaic style designs produced on the surface of the tile substrate by the present invention exhibit the artistic detail and definition of a hand-set mosaic in a far less time-consuming and costly manner. The present inventive process further provides authentic looking reproductions of mosaic artwork on tiles having the same aesthetic effect and visual impression as the original mosaic article. The present invention additionally provides a more efficient and reliable manufacturing process for recreating a mosaic artwork on a tile substrate than heretofore demonstrated, with more exact and varied decorative colorations not previously provided without hand painting.

Obviously other embodiments and modifications of the present invention will readily come to those of ordinary skill in the art having the benefit of the teachings presented in the foregoing description and drawings. For example, in the case of the production of wall and mural tiles where a "soft" (MOH of approximately 3) tile substrate 12 is sufficient for use, a thin, slightly "harder" glaze coating (MOH of approximately 4) may be applied across the entire substrate surface and the tile substrate further processed through the same stages of operation according to the above-described invention. In such a case, while the buildup of "harder" glaze will be greater in the unmasked areas representative of the grout line spaces G, the removal of the substrate material from such grout spaces will be expedited and etching of the deepened grooves 42 still tightly formed due to the thinness of the glaze coating and relative softness of the coating in the grout line spaces relative to the ceramic colorations 22 representative of the stone pieces S. It is therefore to be understood that various changes in the details, materials, steps and arrangement of parts, which have been described and illustrated to explain the nature of the invention, may be made by those skilled in the art within the principle and scope of the invention as expressed in the appended claims.

What is claimed is:

1. A method of simulating a mosaic style pattern of separate mosaic pieces and intermediate grout spaces on the surface of a tile substrate, comprising the steps of:
   depositing a plurality of glaze coatings upon the surface of the tile substrate at specific site locations thereon corresponding to the separate mosaic pieces of the pattern;
   forming a plurality of predetermined ceramic colorations on the surface of the substrate directly upon the deposited glaze coatings at each site location thereof; and
   engraving the exposed surface of the tile substrate between and around the specific site locations of the ceramic colorations formed upon the glaze coatings.

2. The method of claim 1, further comprising the following step immediately prior to engraving:
   masking the specific site locations where the glaze coatings are deposited by applying a resist medium to the surface area of the ceramic colorations formed on each glaze coating.

3. The method of claim 2, further comprising the following step immediately after engraving:
   removing the resist medium from the surface area of the ceramic colorations.

4. The method of claim 3, further comprising the step of:
   coating the entire surface of the engraved tile substrate with a clear protective material.

5. The method of claim 1, wherein the step of depositing the glaze coatings comprises:
   applying a thin coating of a glaze formulation to the surface of the substrate at specific site locations corresponding to the separate mosaic pieces of the pattern; and
   firing the tile substrate to harden and secure the applied glaze coatings.

6. The method of claim 1, wherein the step of forming ceramic colorations comprises:
   applying a predetermined formulation of ceramic coloration directly over each glaze coating at a site location corresponding to a respective mosaic piece; and
   firing the tile substrate to harden and secure the applied ceramic coloration.

7. The method of claim 6, wherein the step of applying ceramic colorations is effected by decal transfer.

8. A process for treating the surface of a tile substrate to reproduce thereon a mosaic design having simulated mosaic pieces separated by grout spaces, comprising the steps of:
   selectively glazing the surface of the substrate with a plurality of separate glaze coatings at site locations on the substrate surface specifically corresponding to the position of the mosaic pieces of the design;
   decorating the surface of the selectively glazed substrate with a formulation of ceramic colorations applied directly over the glaze coatings;
   masking the surface of the decorated substrate with an etch resist medium applied over the ceramic colorations;
   etching the surface of the masked substrate between and around the protected ceramic colorations to form deepened grooves in the substrate surface representative of the grout spaces of the mosaic design; and
   removing the resist medium from the ceramic colorations on the surface of the etched substrate.

9. The process of claim 8, further comprising the step of:
   applying a clear protective coating across the entire surface of the substrate.

10. The process of claim 8 wherein the formulation of each ceramic coloration is relatively harder than the respective glaze coating thereunder but with each having the same coefficient of expansion.

11. The process of claim 8 wherein the step of selectively glazing the surface of the substrate is effected by direct screen printing of the surface using a master outline duplicating the mosaic design.

12. A tile article manufactured having a desired mosaic design simulated upon the surface thereof representative of individual mosaic pieces separated by grout spaces, comprising:
   a blank tile substrate;
   a plurality of separate glaze coatings deposited upon the surface of the tile substrate at specific locations thereon corresponding to the respective positions of the individual mosaic pieces of the design;
   a plurality of ceramic colorations each formulated and deposited directly upon a respective one of the glaze coatings according to the desired mosaic design; and
   a pattern of grooves etched into the surface of the tile substrate between and around the specific locations of the respectively deposited glaze coatings and ceramic colorations.

13. The tile article of claim 12, further comprising:
   a clear protective coating applied over the entire surface of the substrate.

14. The tile article of claim 13 wherein the ceramic colorations are formulated to be relatively harder than the respective glaze coating thereunder but with each having the same coefficient of expansion.

15. The tile article of claim 12 wherein the glaze coatings are formulated having a predetermined hardness dependent upon the intended use of the tile article.

* * * * *